US008289167B2

(12) United States Patent
Bauchot et al.

(10) Patent No.: US 8,289,167 B2
(45) Date of Patent: Oct. 16, 2012

(54) APPARATUS FOR SECURING A LAND SURVEYOR'S MARK BASED ON THE USE OF A RADIO FREQUENCY IDENTIFIER TAG

(75) Inventors: Frederic Bauchot, Saint-Jeannet (FR); Gerard Marmigere, Drap (FR); Pierre Secondo, Tourrettes-sur-Loup (FR)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 12/306,272

(22) PCT Filed: Apr. 19, 2007

(86) PCT No.: PCT/EP2007/053814
§ 371 (c)(1),
(2), (4) Date: Dec. 23, 2008

(87) PCT Pub. No.: WO2008/000533
PCT Pub. Date: Jan. 3, 2008

(65) Prior Publication Data
US 2009/0201154 A1    Aug. 13, 2009

(30) Foreign Application Priority Data
Jun. 30, 2006    (EP) .................................... 06116440

(51) Int. Cl.
*G08B 13/14*    (2006.01)
(52) U.S. Cl. .................. 340/572.8; 340/568.2; 340/652; 340/572.1; 340/8.1; 340/693.9; 52/103
(58) Field of Classification Search ............... 340/568.1, 340/568.2, 572.8, 652
See application file for complete search history.

(56) References Cited

U.S. PATENT DOCUMENTS
4,237,536 A * 12/1980 Enelow et al. ................ 705/413
(Continued)

FOREIGN PATENT DOCUMENTS
CA    2417616 A1    7/2002
(Continued)

OTHER PUBLICATIONS

Challstrom, C.W., NOAA Chairperson, Federal Geodetic Control Subcommittee; Input Formats and Specifications of the Geodetic Survey Data Base, Appendix P (The Description Processing Handbook); Mar. 2003; Appendix P updated Mar. 2007 U. S. Dept. of Commerce, NOAA, NGS, Silver Springs MD; http://www.ngs.noaa.gov/FGCS/BlueBook/ Sections: 3.3.1,6,7.*

(Continued)

*Primary Examiner* — Benjamin C Lee
*Assistant Examiner* — Stephen Burgdorf
(74) *Attorney, Agent, or Firm* — Schmeiser, Olsen & Watts; John Pivnichny

(57) ABSTRACT

A surveyor's mark and a method for forming the mark. The mark includes a stick and a head assembled to the stick. The stick is configured to be planted in a ground and the head is configured to be above the ground. The head includes a tag having an identification number. The identification number has a value which is a first code value. The stick includes a thin wire configured as an electrical conducting loop and connected to the tag. If the stick is planted in the ground and the head is above the ground, then pulling the head in an attempt to pull up the mark from the ground results in the head being disassembled from the stick and the thin wire breaking so as to open the loop which changes the value of the identification number from the first code value to a second code value.

20 Claims, 3 Drawing Sheets

U.S. PATENT DOCUMENTS

| | | | |
|---|---|---|---|
| 4,441,288 A * | 4/1984 | Feldman et al. | 52/103 |
| 4,614,945 A * | 9/1986 | Brunius et al. | 340/870.03 |
| 4,625,473 A * | 12/1986 | Peterson et al. | 52/98 |
| 5,111,184 A | 5/1992 | Heaton et al. | |
| 5,512,879 A | 4/1996 | Stokes | |
| 5,521,601 A | 5/1996 | Kandlur et al. | |
| 5,528,222 A | 6/1996 | Moskowitz et al. | |
| 5,541,577 A | 7/1996 | Cooper et al. | |
| 5,646,592 A | 7/1997 | Tuttle | |
| 5,774,876 A | 6/1998 | Woolley et al. | |
| 5,804,810 A | 9/1998 | Wooley et al. | |
| 5,825,298 A | 10/1998 | Walter | |
| 5,959,568 A | 9/1999 | Woolley | |
| 6,025,780 A * | 2/2000 | Bowers et al. | 340/572.3 |
| 6,031,457 A | 2/2000 | Bonkowski et al. | |
| 6,104,337 A | 8/2000 | Coutts et al. | |
| 6,137,413 A | 10/2000 | Ryan, Jr. | |
| 6,255,959 B1 * | 7/2001 | Lake et al. | 340/693.5 |
| 6,271,753 B1 | 8/2001 | Shukla | |
| 6,275,157 B1 | 8/2001 | Mays et al. | |
| 6,424,264 B1 | 7/2002 | Giraldin et al. | |
| 6,515,591 B2 * | 2/2003 | Lake et al. | 340/693.5 |
| 6,662,642 B2 | 12/2003 | Breed et al. | |
| 6,720,866 B1 | 4/2004 | Sorrells et al. | |
| 6,844,816 B1 * | 1/2005 | Melton et al. | 340/572.1 |
| 6,882,284 B2 * | 4/2005 | Lake et al. | 340/693.5 |
| 6,960,999 B2 * | 11/2005 | Haimovitch et al. | 340/572.1 |
| 7,002,461 B2 * | 2/2006 | Duncan et al. | 340/505 |
| 7,042,357 B2 | 5/2006 | Girvin et al. | |
| 7,081,820 B2 * | 7/2006 | Minarovic | 340/572.8 |
| 7,098,794 B2 | 8/2006 | Lindsay et al. | |
| 7,119,690 B2 | 10/2006 | Lerch et al. | |
| 7,151,455 B2 | 12/2006 | Lindsay et al. | |
| 7,170,412 B2 | 1/2007 | Knox et al. | |
| 7,176,796 B2 | 2/2007 | Chen et al. | |
| 7,382,262 B2 | 6/2008 | Commagnac et al. | |
| 7,382,266 B2 * | 6/2008 | Minarovic | 340/572.8 |
| 7,383,053 B2 | 6/2008 | Kent et al. | |
| 7,791,484 B2 | 9/2010 | Commagnac et al. | |
| 7,812,719 B2 | 10/2010 | Djuric et al. | |
| 7,962,150 B2 | 6/2011 | Hertzog et al. | |
| 8,207,820 B2 | 6/2012 | Bauchot et al. | |
| 2001/0008390 A1 | 7/2001 | Berquist et al. | |
| 2002/0073915 A1 * | 6/2002 | Howard | 116/209 |
| 2002/0109607 A1 * | 8/2002 | Cumeralto et al. | 340/870.02 |
| 2003/0099158 A1 | 5/2003 | De la Huerga | |
| 2003/0234293 A1 | 12/2003 | Sauve et al. | |
| 2004/0066296 A1 | 4/2004 | Atherton | |
| 2004/0108954 A1 | 6/2004 | Richley et al. | |
| 2004/0212480 A1 | 10/2004 | Carrender et al. | |
| 2005/0068169 A1 * | 3/2005 | Copley et al. | 340/539.13 |
| 2005/0092072 A1 | 5/2005 | Wollenberg et al. | |
| 2005/0093702 A1 | 5/2005 | Twitchell | |
| 2005/0203681 A1 * | 9/2005 | Minor | 701/23 |
| 2006/0066444 A1 | 3/2006 | Steeves | |
| 2006/0092072 A1 | 5/2006 | Steiner | |
| 2006/0111123 A1 | 5/2006 | Nerat | |
| 2006/0162207 A1 * | 7/2006 | Morton et al. | 40/607.05 |
| 2006/0208887 A1 | 9/2006 | Fields et al. | |
| 2006/0220955 A1 * | 10/2006 | Hamilton | 342/357.13 |
| 2006/0238341 A1 | 10/2006 | Commagnac et al. | |
| 2007/0001809 A1 | 1/2007 | Kodukula et al. | |
| 2007/0013541 A1 | 1/2007 | Harazin et al. | |
| 2007/0052539 A1 * | 3/2007 | Brown | 340/571 |
| 2007/0080783 A1 | 4/2007 | Ghosh et al. | |
| 2007/0115125 A1 | 5/2007 | Lyon et al. | |
| 2007/0126579 A1 * | 6/2007 | Adams et al. | 340/572.1 |
| 2007/0126583 A1 | 6/2007 | Maniwa et al. | |
| 2007/0247366 A1 | 10/2007 | Smith et al. | |
| 2007/0285245 A1 | 12/2007 | Djuric et al. | |
| 2007/0288995 A1 | 12/2007 | Terada et al. | |
| 2007/0290924 A1 | 12/2007 | McCoy | |
| 2008/0061939 A1 | 3/2008 | Davis et al. | |
| 2008/0211676 A1 | 9/2008 | Commagnac et al. | |
| 2008/0261615 A1 | 10/2008 | Kalhan | |
| 2009/0160603 A1 | 6/2009 | Bauchot et al. | |
| 2009/0160622 A1 | 6/2009 | Bauchot et al. | |
| 2009/0315679 A1 | 12/2009 | Bauchot et al. | |
| 2009/0315685 A1 | 12/2009 | Bauchot et al. | |

FOREIGN PATENT DOCUMENTS

| | | | |
|---|---|---|---|
| JP | 2000018947 A * | 1/2000 | |
| JP | 20011205387 | 7/2001 | |
| JP | 2003141649 A | 5/2003 | |
| JP | 2006309592 | 11/2006 | |
| KR | 20030067372 A | 8/2003 | |
| KR | 1020040018301 | 3/2004 | |
| KR | 20050116587 A | 12/2005 | |
| KR | 20070010340 | 1/2007 | |
| WO | WO0077344 A1 | 12/2000 | |
| WO | 0106444 | 1/2001 | |
| WO | 02077939 A1 | 11/2001 | |
| WO | WO2005/027079 A1 * | 3/2005 | |
| WO | W02006105381 A1 | 10/2006 | |
| WO | 2007002941 | 1/2007 | |
| WO | 2007006085 | 1/2007 | |
| WO | 2007041153 | 4/2007 | |
| WO | 2007060619 | 5/2007 | |
| WO | 2007064747 | 6/2007 | |

OTHER PUBLICATIONS

Pham, H.Q. and Marks, M.J.;Kirk-Othmer Encyclopedia of Chemical Technology, vol. 10: Epoxy Resins John Wiley & Sons, Nov. 19, 2004 p. 348, second paragraph; pp. 457-459, Section 21.4 (Other Electrical and Electronica Applications) and Section 21.5 (Adhesives).*

Office Action (Mail Date Jan. 13, 2010) for U.S. Appl. No. 12/109,319, filed Apr. 24, 2008.

Response dated Feb. 1, 2010 to Office Action (Mail Date Jan. 13, 2010) for U.S. Appl. No. 12/109,319, filed Apr. 24, 2008.

Notice of Allowance (Mail Date May 11, 2010) for U.S. Appl. No. 12/109,319, filed Apr. 24, 2008.

Office Action (Mail Date Oct. 17, 2007) for U.S. Appl. No. 11/406,911, filed Apr. 19, 2006.

Response dated Nov. 5, 2007 to Office Action (Mail Date Oct. 17, 2007) for U.S. Appl. No. 11/406,911, filed Apr. 19, 2006.

Notice of Allowance (Mail Date Feb. 4, 2008) for U.S. Appl. No. 11/406,911, filed Apr. 19, 2006.

Amendment dated Feb. 15, 2008 in response to Notice of Allowance (Mail Date Feb. 4, 2008) for U.S. Appl. No. 11/406,911, filed Apr. 19, 2006.

Supplemental Notice of Allowability (Mail Date Apr. 9, 2008) for U.S. Appl. No. 11/406,911, filed Apr. 19, 2006.

Office Action (Mail Date Jan. 31, 2012) for U.S. Appl. No. 12/335,601, filed Dec. 16, 2008.

Notice of Allowance (Mail Date Jan. 27, 2012) for U.S. Appl. No. 12/180,664, filed Jul. 28, 2008.

Wang et al., A Novel Solution to the Reader Collision Problem in RFID System, 2006 IEEE, 4 pages.

Pillai et al., Using Volatile State Storage for Substantial Improvement in RFID Throughput, IEEE Xplore, 5 pages.

Mary Catherine O'Connor; Aethon Adds RFID to Robotic Hospital Helpers; RFID Journal—RFID (Radio Frequency Identification) Technology News & Features; Retrieved from the Internet: < URL: http://www.rfidjournal.com/article/articleview/3330/1/1/> [Retrieved Feb. 25, 2008]; 3 pages.

Office Action (Mail Date Sep. 15, 2011) for U.S. Appl. No. 12/234,772, filed Sep. 22, 2008.

Amendment filed Dec. 8, 2011 in Response to Office Action (Mail Date Sep. 15, 2011) for U.S. Appl. No. 12/234,772, filed Sep. 22, 2008.

Office Action (Mail Date Nov. 29, 2011) for U.S. Appl. No. 12/336,594, filed Dec. 17, 2008.

Notice of Allowance (Mail Date Aug. 15, 2011) for U.S. Appl. No. 12/180,664, filed Jul. 28, 2008.

Request for Continued Examined filed Oct. 19, 2011 for U.S. Appl. No. 12/180,664, filed Jul. 28, 2008.

Notice of Allowance (Mail Date Nov. 15, 2011) for U.S. Appl. No. 12/180,664, filed Jul. 28, 2008.

Request for Continued Examined filed Jan. 19, 2012 for U.S. Appl. No. 12/180,664, filed Jul. 28, 2008.

Amendment filed Feb. 28, 2012 in reponse to Office Action (Mail Date Nov. 29, 2011) for U.S. Appl. No. 12/336,594, filed Dec. 17, 2008.

Final Office Action (Mail Date Mar. 22, 2012) for U.S. Appl. No. 12/336,594, filed Dec. 17, 2008.

U.S. Appl. No. 13/418,739, filed Mar. 13, 2012.

Amendment filed Apr. 26, 2012 in response to Office Action (Mail Date Jan. 31, 2012) for U.S. Appl. No. 12/335,601, filed Dec. 16, 2008.

Notice of Allowance (Mail Date Mar. 20, 2012) for U.S. Appl. No. 12/234,772, filed Sep. 22, 2008.

Notice of Allowance (Mail Date Jun. 6, 2012) for U.S. Appl. No. 12/335,601, filed Dec. 16, 2008.

Request for Continued Examination and Preliminary Amendment filed Jun. 21, 2012 for U.S. Appl. No. 12/336,594, filed Dec. 17, 2008.

* cited by examiner

APPARATUS FOR SECURING A LAND SURVEYOR'S MARK BASED ON THE USE OF A RADIO FREQUENCY IDENTIFIER TAG

FIELD OF THE INVENTION

The present invention relates to Geomatics Engineering and Land Information Management more particularly to land, cadastral and engineering surveying. The present invention discloses an apparatus for securing a land surveyor's mark based on the use of a RFID tag (Radio Frequency IDentifier).

BACKGROUND OF THE INVENTION

Geomatics Engineering

Geomatics Engineering is a rapidly developing discipline that focuses on spatial information (i.e. information that has a location). The location is the primary factor used to integrate a very wide range of data for viewing and analysis. Engineering principles are applied to spatial information in order to implement relational data structures involving measurement sciences.

Geomatics engineers manage local, regional, national and global spatial data infrastructures.

Geomatics Engineering is a new expression incorporating what used to be called "Surveying" along with many other aspects of spatial data management. Following the advanced developments in digital data processing, the nature of the tasks required of the Professional Land Surveyor has evolved and the term Surveying alone does not anymore describe the whole range of tasks that the profession deals with. As our societies have become more complex, information with a spatial position associated with it has become more critical to decision-making, from a personal and a business perspective, and a community and a large-scale governmental viewpoint. Therefore the variety of information-gathering activities and applications with which the Geomatics Engineer can be involved is extremely wide. Geomatics engineers design, develop, and operate systems for collecting and analyzing spatial information about the land, the oceans, natural resources, fixed assets and the environment in general. Geomatics Engineering applications include, but are not limited to, integrating science and technology from the new and traditional disciplines of:

Geodesy and Geodetic Science,
Cartography, computer and digital mapping,
Remote sensing, Photogrammetry (photogrammetric mapping),
Land Information Systems (LIS) and Land Information Science,
Land Information Management,
Real Property boundary determination,
Hydrography, Navigation, Topographic and Spatial Computing,
Surveying (including land, cadastral, aerial, mining and engineering surveying),
Construction layout, route design,
Image Understanding and Computer Aided Visualization,
Computer Aided Design (CAD),
Geographic Information Systems (GIS), and Geographic Information Science,
Global Positioning System (GPS), . . .

Real Property Boundary Determination and Marking

The more traditional Land Surveying strand of Geomatics Engineering is concerned with the determination and recording of boundaries and areas of real property parcels, and the preparation and interpretation of legal land descriptions. The tasks more closely related to Civil Engineering include the design and layout of public infrastructure and urban subdivisions, and mapping and control surveys for engineering projects.

Geomatics Engineers serve society by collecting, monitoring, archiving and maintaining diverse spatial data infrastructures. Geomatics engineers utilize a wide range of technologically advanced tools such as digital INK"../../../wiki/Theodolite"theodolite/distance meter total stations, Global Positioning System (GPS) equipment, digital aerial imagery (both satellite and air-borne), and computer-based geographic information systems (GIS). These tools enable the Geomatics Engineer to gather, analyze, and manage spatially related information to solve a wide range of technical and societal problems.

Geomatics Engineering is the field of activity that integrates the acquisition, processing, analysis, display and management of spatial information.

Land Surveyor's Marks

Currently, in "Real property boundary determination and marking", the first and mandatory activity of a land surveyor is to find and identify on the ground any already existing "surveyor's marks". In fact this is a legal obligation (however, low may vary depending on the country), to link his work to any previous surveying work that may have been done in the past, in the same or adjacent areas. Public marks are very well identified and the practitioner can easily find in the public records the characteristics of such a mark (exact geographical position and elevation). In contrast, in the private domain it is sometimes extremely difficult, once a previous surveyor's mark is found, to know what it delimits. Most of the time, the only way to determine what an existing mark indicates, is to find who is the professional who had positioned this mark. Finding the Practitioner who did position the found marks can take a very long time, and be very costly, sometimes it is even impossible. Moreover, the mark may have been pooled out and moved, and it is not obvious to discover that.

PRIOR ART

The main problem that the prior art proposes to solve is to prevent surveyor's marks from being pulled up from the ground. The mechanical security of surveyor's marks is ensured by using stakes with some physical features like points of harpoon.

SUMMARY OF THE INVENTION

The present invention is directed to a mark as defined in independent claims.

The mark according to the present invention comprises two parts, a first part intended to be planted in the ground and a second part assembled on the top of said first part. The mark is characterized in that:

a tag, preferably a RFID tag, which code value can be read by an appropriate wireless device, is imbedded and sealed in the second part of the mark;

a thin wire sealed in the first part of the mark and making an electrical conducting loop is connected to the tag, said tag having a first code value when said loop is closed and having a second code value when the loop is open;

wherein, when the first part is firmly planted in the ground, pulling the head in order to pull up the mark will result in disassembling the two parts of the mark;
breaking the thin wire and opening of the loop; and thus changing the code value of the tag.

Further embodiments of the invention are provided in the appended dependent claims.

This invention has many advantages as will be explained further below.

The foregoing, together with other objects, features, and advantages of this invention can be better appreciated with reference to the following specification, claims and drawings.

BRIEF DESCRIPTION OF THE DRAWINGS

The new and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

General Principles

The present invention relates to Geomatics Engineering and more particularly to "Land Information Management" such as surveying, including land, cadastral and engineering surveying. The present invention discloses an apparatus comprising means for:

1—immediately retrieving information related to a surveyor's mark:
   position of the mark (geographical coordinates),
   elevation of the mark,
   identification of the mark,
   identification of the surveyor who positioned the mark (or professional responsible of the mark),
   . . . ;
2—determining whether or not the mark has been moved.

The surveyor's mark according to the present invention has the following characteristics:
   A RFID (Radio Frequency IDentifier) tag is embedded in the surveyor's mark. This RFID tag comprises information related to the mark. This information is written (and signed) by the surveyor who positioned it.
   Once the mark has been positioned, the information in the RFID tag cannot be modified anymore.
   The RFID tag is embedded using a process that guarantee its duration over time.
   Any malicious action aiming at moving (pulling up) the mark will be detected and reported by the RFID tag when it will be read.

Physical Description

Figure 1:
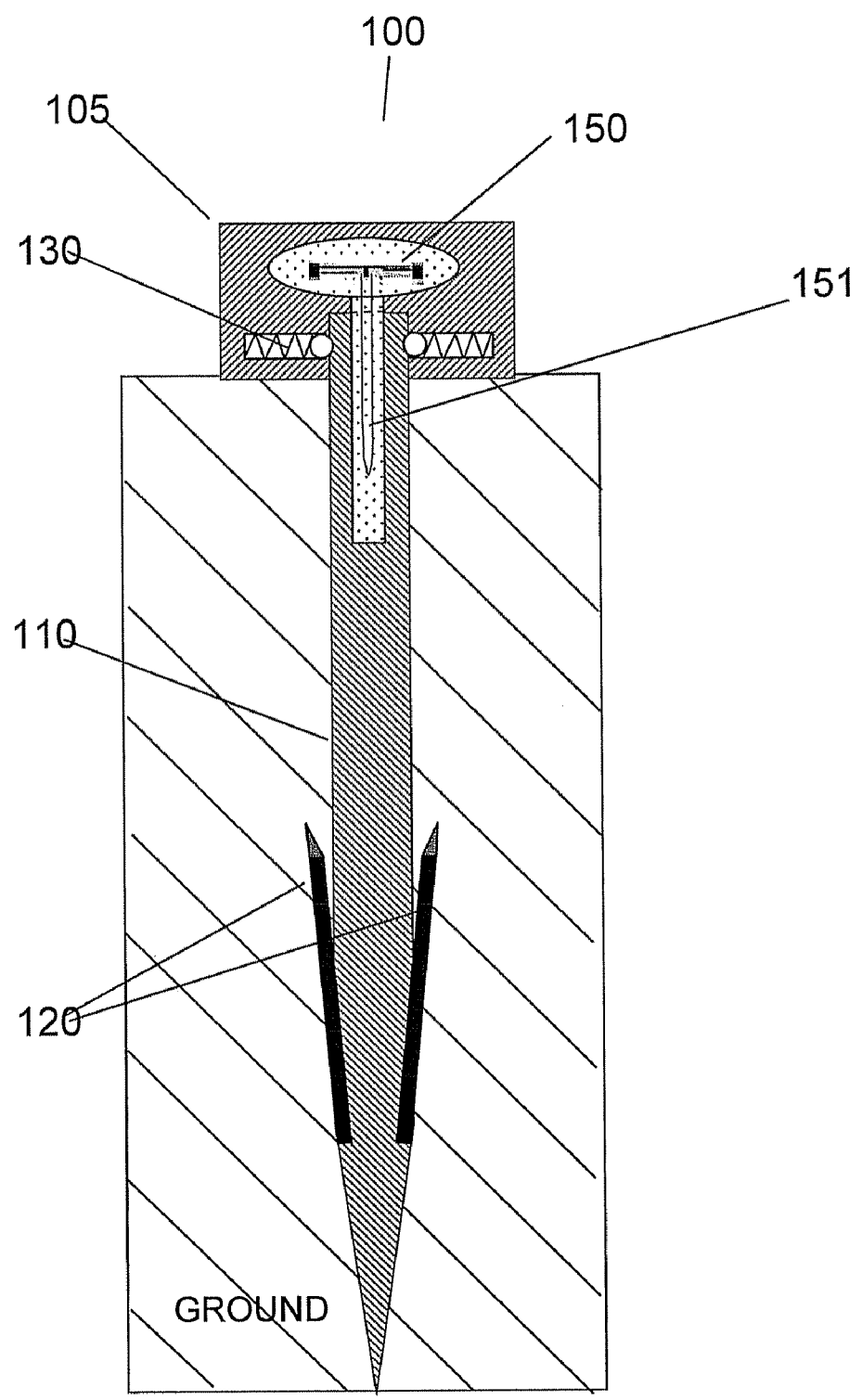
FIG. 1 is a general view of the mechanical assembly according to the present invention.
Figure 2:
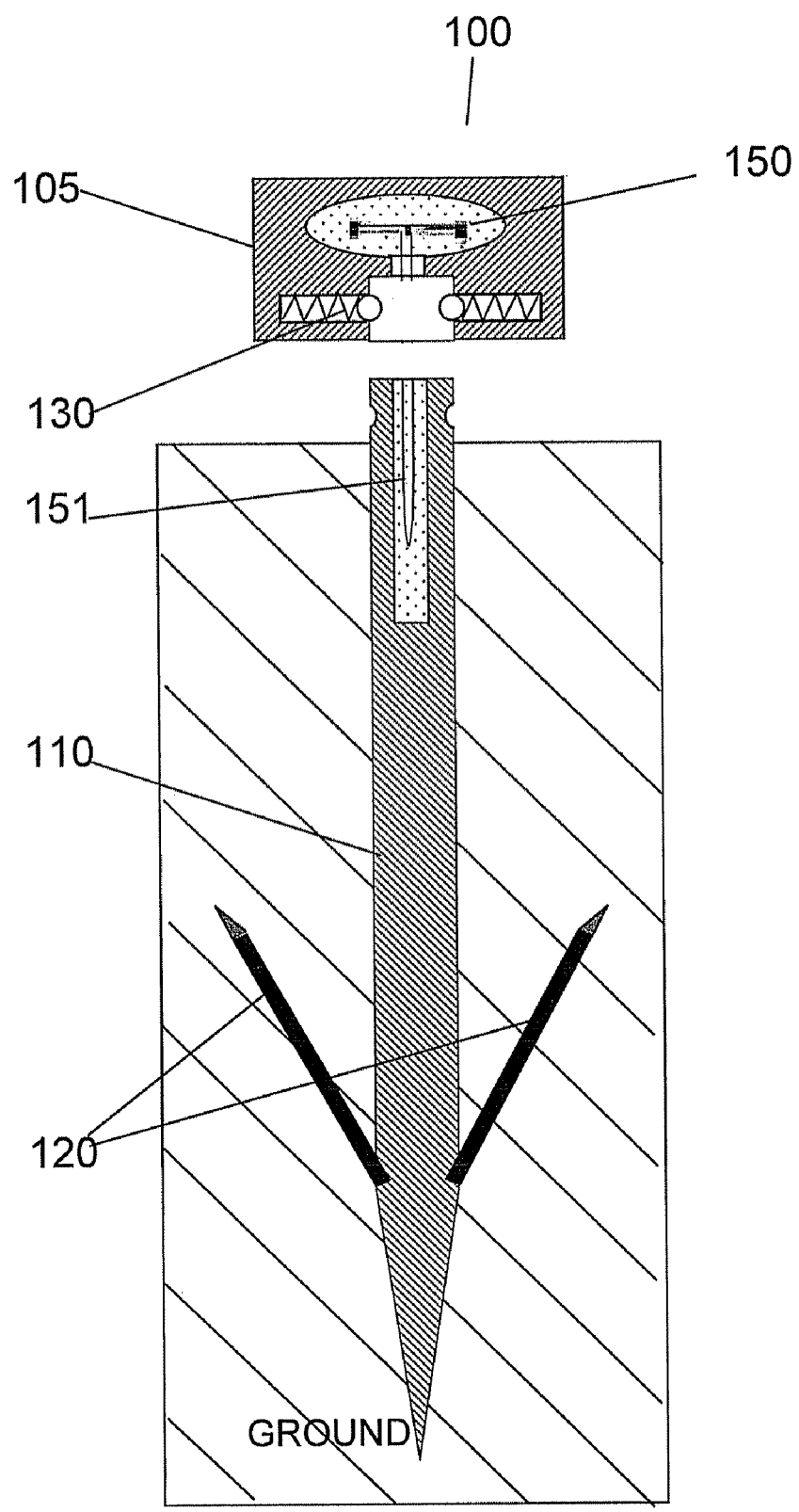
FIG. 2 is view of the disassembled surveyor's mark according to the present invention.

The present invention is based on the RFID technology. As shown in FIG. 1, the secured mark has the shape of a "stake" or "peg" (100). The mark is made of non-oxidizing metal, and is composed of two pieces:
   A head (105) and a stick (110) are assembled together thanks to a specific mechanism (130), in such a way that if the stick is firmly deep-set in the ground, pulling the head in order to dig out the mark will result in the disassembly of the two parts (head and stick) of the mark as shown in FIG. 2. The mechanism (130), is a classical system based on springs embedded into the mark head. The springs firmly push balls into small cavities in the mark stick. The strength of the springs is calibrated to guarantee that the head and the stick will be disassembled, before the stick can be extracted from the ground.
   A harpoon system (120) is also added to the top of the stick to ensure that the pulling up of the mark is not possible without disassembling the apparatus.

FIGS. 1 and 2 show also how the mechanical assembly is maintained and goes off if the mark's head is pulled up.

A RFID tag (150) is imbedded into the stake head (105), and securely sealed with a material like epoxy resin. A thin wire (151) making an electrical conducting loop, is connected to the chip of the RFID tag (150). The loop is sealed into a cavity in the stick of the mark. As shown in FIG. 2, in case of disassembly of the mark's head (105) and stick (110), the thin wire (151) will break, the electrical circuit made by the thin wire (151) will be open and the RFID code will change. As illustrated in FIGS. 3(*a*) and 3(*b*), the RFID tag will then give a different code (ID number) when it will be read.

FIGS. 3(*a*) and 3(*b*) illustrate a possible implementation of the electric circuitry in the RFID tag (150), where the last bit (LSB) of the register (332), is flipped from the value 0 to the value 1 when the thin wire (151) is broken.

RFID Tags

According to the invention, a Radio Frequency IDentifier (RFID) tag is imbedded in the stake head and securely sealed.

The core of any RFID system is the 'Tag' or 'Transponder', which can be attached to or embedded within objects, wherein data can be stored. An RFID reader, generically referred to as reader in the following description, sends out a radio frequency signal to the RFID tag that broadcasts back its stored data to the reader. The system works basically as two separate antennas, one on the RFID tag and the other on the reader. The read data can either be transmitted directly to another system like a host computer through standard interfaces, or it can be stored in a portable reader and later uploaded to the computer for data processing. An RFID tag system works effectively in environments with excessive dirt, dust, moisture, and/or poor visibility. It generally overcomes the limitations of other automatic identification approaches.

Several kinds of RFID, such as piezoelectric RFID and electronic RFID, are currently available. For example, passive RFID tags do not require battery for transmission since generally, they are powered by the reader using an induction mechanism (an electromagnetic or magnetic field is emitted by the reader antenna and received by an antenna localized on the RFID tag). This power is used by the RFID tag to transmit a signal back to the reader, carrying the data stored in the RFID tag. Active RFID tags comprise a battery to transmit a signal to a reader. A signal is emitted at a predefined interval or transmit only when addressed by a reader.

When a passive High Frequency (HF) RFID tag is to be read, the reader sends out a power pulse to the RFID antenna. The electro-magnetic field generated is 'collected' by the antenna in the RFID tag that is tuned to the same frequency. When the power pulse has finished, the RFID tag immediately transmits back is data. This data is picked up by the receiving antenna and decoded by the reader.

RFID tags can be read-only, write-once, or read-write.

Possible Implementation of the Electric Circuitry in the RFID Tag

Figure 3A:
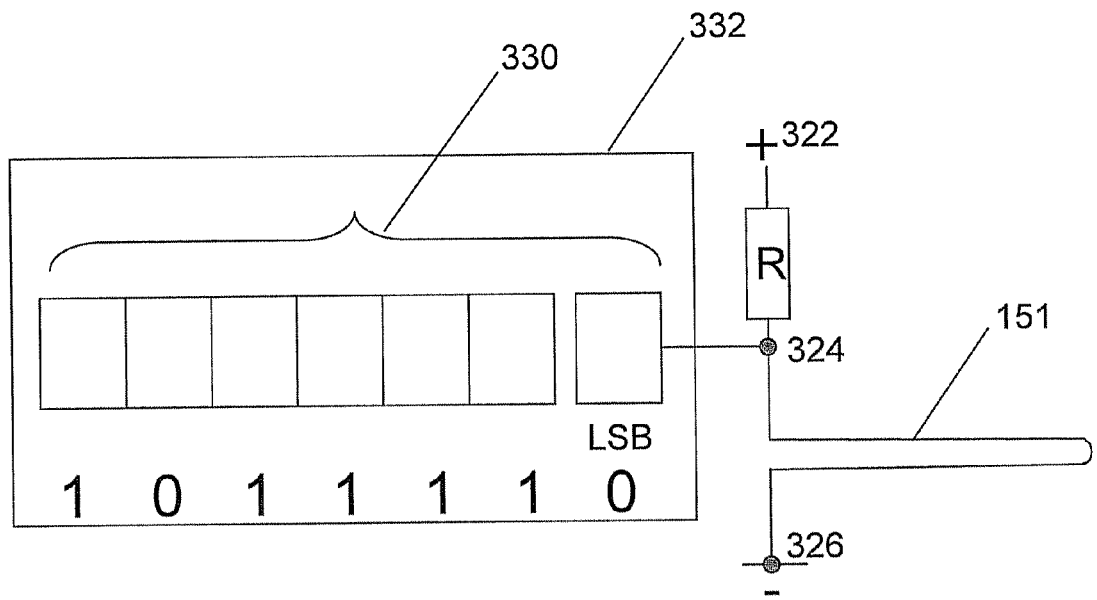
FIGS. 3(*a*) and 3(*b*) illustrates a possible implementation of the electric circuitry in the RFID tag according to the present invention.

Referring to FIG. 3*a*, the RFID tag (150) according to the present invention comprises a circuit having three nodes (322), (324) and (326). The internal RFID tag's memory register (332), (of which only last byte is shown in FIG. 3), is connected to a load resistor R and the load resistor is in turn connected between nodes (322) and (324). An RFID tag can be identified by means of its code (or ID number) (330). The ID number (330) (of which only last byte is shown in FIG. 3), is generally stored in a memory (EEPROM or FRAM) in the RFID tag (150), and transferred to the tag's memory register (332) (on receipt of an incoming RF signal transporting a "read" command) for subsequent transmission to a reader (not shown). In the present case, the least significant bit (LSB) of the tag's memory register (332) is connected to node (324).

When the surveyor's mark is positioned for the first time and sealed, the thin wire loop (151) forms an electrical connection with the RFID tag (150). The thin wire loop (151) is connected between nodes (324) and (326), to connect the voltage to ground. Accordingly, the electrical connection formed by the intact thin wire loop (151) ensures that the voltage setting the LSB (tamper indicator bit) of the tag's memory register has a low-level. This results in an even tag ID number (330).

Figure 3B:
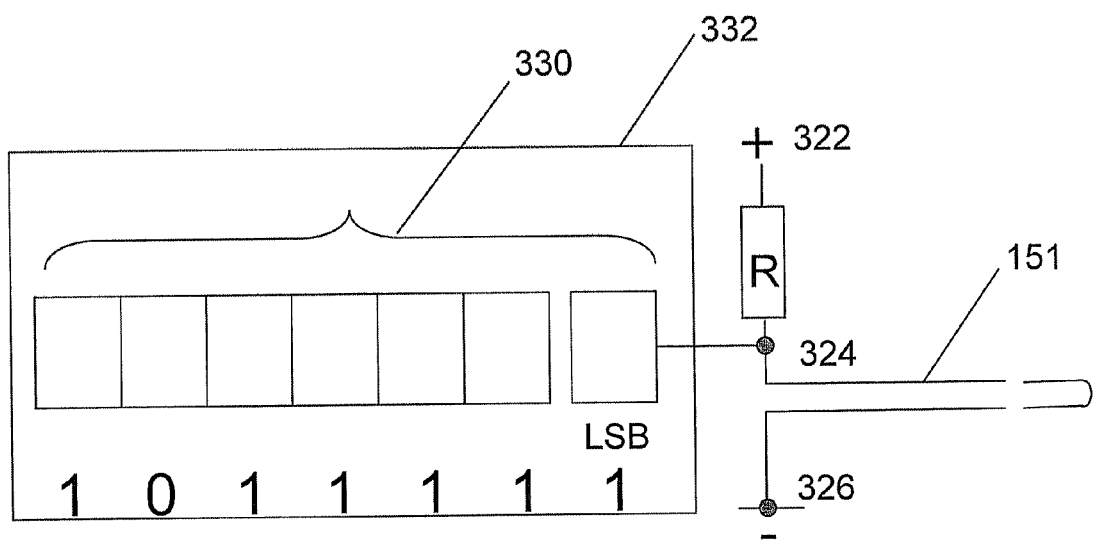

However, referring to FIG. 3(b), if the mark is disassembled, the thin wire loop (151) and the electrical connection with the RFID tag (150) is broken (i.e. the voltage is not connected to ground). Consequently, the voltage setting the LSB of the tag's memory register (332) attains a high value. The tamper indicator bit value is flipped, this results in an odd tag ID number.

In conclusion, a RFID tag in a surveyor's mark answers a reader with an even identification code number after being positioned for the first time and an odd number if the mark has been disassembled. In other words, the breaking of the thin wire loop (151) modifies the response returned by the RFID tag (150) when read, so that, even if the mark is reassembled into its original state, the RFID tag will still report the disassembling of the mark.

Information Stored in the RFID Tag

Information can be entered in the RFID tag by the land surveyor who is doing the marking work, in a non volatile memory of the tag. The information is stored once the mark has been deep-set in the ground using a portable RFID reader/Writer. Once written the information cannot be modified (case of a "Write once/read many" type of RFID tag). For instance, the RFID may contain the following information:

an identifier of the mark (a unique serial number per manufacturer). A specific bit of the identifier can be defined as a tamper indicator bit. This bit is flipped from 0 to 1 or from 1 to 0 depending on the convention, if the mark is tampered;
geographical coordinates, and elevation of the mark;
a reference number of the marking work;
the date of the marking work;
an identification of the Geomatics Engineer (Land Surveyor), . . .

Advantages

A series of marks delimiting an area, can be read automatically and quickly by just passing nearby with an handheld RFID reader. The information stored in the reader can then be transferred to a computer. In a preferred embodiment the reader is wirelessly connected to the computer (a wire-connected reader would not be practical). Thanks to the present invention it is possible to automatically and dynamically build a map and to save time compared with traditional methods.

The position of the mark is certified by the fact that the "tamper indicator bit" has still its original value.

Moreover, the collect of the information can be executed by a non-professional operator.

While the invention has been particularly shown and described with reference to a preferred embodiment, it will be understood that various changes in form and detail may be made therein without departing from the spirit, and scope of the invention.

What is claimed is:

1. A surveyor's mark, comprising:
a stick configured to be planted in a ground; and
a head removably assembled to the stick and configured to be above the ground when the stick is planted in the ground such that the head removably assembled to the stick facilitates separation of the head from the stick upon an attempted removal of the surveyor's mark,
wherein the head comprises a tag;
wherein the tag in the head comprises an identification number that identifies the tag and indicates if the head is disassembled from the stick,
wherein the identification number has a value consisting of a first code value,
wherein the stick comprises a thin wire configured as an electrical conducting loop and connected to the tag, and
wherein if the stick is planted in the ground and the head is above the ground, then pulling the head in an attempt to pull up the mark from the ground results in the head being disassembled from the stick and the thin wire breaking so as to open the loop which changes the value of the identification number in the tag in the head from the first code value to a second code value that differs from the first code value.

2. The mark of claim 1, wherein if the mark is reassembled by the head being reassembled to the stick after having been disassembled from the stick, then the value of the identification number of the tag in the reassembled mark is the second code value.

3. The mark of claim 1, wherein the identification number is a sequence of binary bits whose least significant bit is 0 or 1, and wherein the second code value is a value of the sequence of bits in which the least significant bit has been changed by the breaking of the thin wire from 0 to 1 or from 1 to 0.

4. The mark of claim 3, wherein the least significant bit for the first code value is set by being electrically connected to a ground voltage by the loop of the thin wire, and wherein the least significant bit for the second code value is set by being electrically connected to a voltage differing from the ground voltage due to the loop of the thin wire being open.

5. The mark of claim 4, wherein the tag comprises a circuit having a first node, a second node, and a third node, wherein a load resistor is disposed between and electrically connected to the first node and the second node, wherein a first end of the loop is at the second node and the least significant bit for the first code value is at and electrically connected to the second node, and wherein a second end of the loop is at the third node which is at the ground voltage.

6. The mark of claim 1, wherein the stick comprises a harpoon system to ensure that the pulling up of the mark is not possible without the head being disassembled from the stick.

7. The mark of claim 1, wherein the tag is a Radio Frequency IDentifier (RFID) tag, wherein the RFID tag comprises information that cannot be modified, and wherein the information includes geographical coordinates of the mark, an elevation of the mark, and an identification of a surveyor who positioned the mark.

8. The mark of claim 1, wherein the mark is made of non-oxidizing metal.

9. The mark of claim 1, wherein the tag is securely sealed in the head via use of epoxy resin.

10. The mark of claim 1, wherein the loop is securely sealed in a cavity within the stick.

11. A method for forming a surveyor's mark, said method comprising:
  embedding a tag in a head, and
  assembling a removable head to a stick,
    wherein the mark comprises the stick and the head;
    wherein the stick is configured to be planted in a ground and the head is configured to be above the ground when the stick is planted in the ground such that the head removably assembled to the stick facilitates separation of the head from the stick upon an attempted removal of the surveyor's mark,
    wherein the tag in the head comprises an identification number that identifies the tag and indicates if the head is disassembled from the stick,
    wherein the identification number has a value consisting of a first code value,
    wherein the stick comprises a thin wire configured as an electrical conducting loop and connected to the tag, and
    wherein if the stick is planted in the ground and the head is above the ground, then pulling the head in an attempt to pull up the mark from the ground, results in the head being disassembled from the stick, and the thin wire breaking so as to open the loop, which changes the value of the identification number in the tag in the head from the first code value to a second code value that differs from the first code value.

12. The method of claim 11, wherein if the mark is reassembled by the head being reassembled to the stick after having been disassembled from the stick, maintaining the value of the identification number of the tag in the reassembled mark to be the second code value.

13. The method of claim 11, wherein the identification number is a sequence of binary bits whose least significant bit is 0 or 1, and wherein the second code value is a value of the sequence of bits in which the least significant bit has been changed by the breaking of the thin wire from 0 to 1 or from 1 to 0.

14. The method of claim 13, wherein the least significant bit for the first code value is set by being electrically connected to a ground voltage by the loop of the thin wire, and wherein the least significant bit for the second code value is set by being electrically connected to a voltage differing from the ground voltage due to the loop of the thin wire being open.

15. The method of claim 14, wherein the tag comprises a circuit having a first node, a second node, and a third node, wherein a load resistor is disposed between and electrically connected to the first node and the second node, wherein a first end of the loop is at the second node and the least significant bit for the first code value is at and electrically connected to the second node, and wherein a second end of the loop is at the third node which is at the ground voltage.

16. The method of claim 11, wherein the stick comprises a harpoon system to ensure that the pulling up of the mark is not possible without the head being disassembled from the stick.

17. The method of claim 11, wherein the tag is a Radio Frequency IDentifier (RFID) tag, wherein the RFID tag comprises information that cannot be modified, and wherein the information includes geographical coordinates of the mark, an elevation of the mark, and an identification of a surveyor who positioned the mark.

18. The method of claim 11, wherein the mark is made of non-oxidizing metal.

19. The method of claim 11, wherein the tag is securely sealed in the head via use of epoxy resin.

20. The method of claim 11, wherein the loop is securely sealed in a cavity within the stick.

* * * * *